US012807275B2

(12) United States Patent
Goetz et al.

(10) Patent No.: US 12,807,275 B2
(45) Date of Patent: Nov. 24, 2026

(54) DEVICE FOR REDUCING HYDRODYNAMIC DRAG

(71) Applicant: NEPTECH, Aix-en-Provence (FR)

(72) Inventors: Tanguy Goetz, Paris (FR); Corentin Bigot, Aix-en-Provence (FR); Clément Rousset, Aix-en-Provence (FR)

(73) Assignee: NEPTECH, Aix-en-Provence (FR)

(*) Notice: Subject to any disclaimer, the term of this patent is extended or adjusted under 35 U.S.C. 154(b) by 509 days.

(21) Appl. No.: 18/264,492

(22) PCT Filed: Feb. 17, 2022

(86) PCT No.: PCT/EP2022/053878

§ 371 (c)(1),
(2) Date: Aug. 7, 2023

(87) PCT Pub. No.: WO2022/175360

PCT Pub. Date: Aug. 25, 2022

(65) Prior Publication Data

US 2024/0043095 A1 Feb. 8, 2024

(30) Foreign Application Priority Data

Feb. 17, 2021 (FR) ....................................... 2101536

(51) Int. Cl.

*B63B 1/38* (2006.01)
*B63H 21/00* (2006.01)
*H01M 8/04746* (2016.01)

(52) U.S. Cl.

CPC .......... *B63B 1/38* (2013.01); *B63H 2021/003* (2013.01); *H01M 8/04761* (2013.01); *H01M 2250/20* (2013.01); *Y02T 90/40* (2013.01)

(58) Field of Classification Search

CPC ....... B63B 1/38; B63B 2001/385; B63B 1/26; B63B 2001/387; B63B 17/00; B63B 1/32;
(Continued)

(56) References Cited

U.S. PATENT DOCUMENTS 6,356,816 B1 * 3/2002 Katz ......................... B63B 1/38
114/67 A
2002/0014192 A1 2/2002 Takahashi et al.
(Continued)

FOREIGN PATENT DOCUMENTS

CN 102241272 A 11/2011
CN 105438398 A 3/2016
(Continued)

OTHER PUBLICATIONS

Ahmadzadehtalatapeh et al., A Review on the Drag Reduction Methods of the Ship Hulls for Improving the Hydrodynamic Performance [online]. IJMT, 2015 [retrieved on Nov. 26, 2025]. Retrieved from the Internet: <URL: https://ijmt.ir/browse.php?a_code=A-10-541-1&slc_lang=en&SID=1>. (Year: 2015).*
(Continued)

*Primary Examiner* — Lars A Olson
*Assistant Examiner* — Eric Anthony Starck
(74) *Attorney, Agent, or Firm* — CUSHMAN PARTNERS LLC

(57) ABSTRACT

A device for reducing hydrodynamic drag of a vessel including a hull; a fuel cell, and a system of conveyance of a first amount of air discharged by the fuel cell to at least one system of injection included by the hull, the system of injection being configured to inject the first amount of air opposite a surface of the hull intended to be immersed.

9 Claims, 2 Drawing Sheets

(58) Field of Classification Search
CPC ... B63B 27/34; B63B 27/24; B63H 2021/003; B63H 21/17; B63H 21/20; Y02T 70/10; Y02T 70/5236; Y02T 90/40; H01M 8/04089; H01M 8/04761; Y02E 60/50; B63J 2/10
USPC .......................................................... 114/67 A
See application file for complete search history.

(56) References Cited

U.S. PATENT DOCUMENTS

| | | | | |
|---|---|---|---|---|
| 2003/0159637 | A1 | 8/2003 | Osmundsvaag | |
| 2005/0215129 | A1 * | 9/2005 | Abdel-Maksoud .... | B63H 11/08 440/38 |
| 2011/0008701 | A1 * | 1/2011 | Akagi .................... | H01M 8/243 429/455 |
| 2012/0315811 | A1 * | 12/2012 | Sancoff .................... | B63G 8/36 440/3 |

FOREIGN PATENT DOCUMENTS

| | | | | | |
|---|---|---|---|---|---|
| CN | 110962991 | A | * | 4/2020 | ............... B63B 1/38 |
| CN | 112238921 | A | * | 1/2021 | ............. B63B 1/248 |
| CN | 1659079 | A | | 8/2025 | |
| DE | 10141893 | A1 | * | 8/2002 | ............. B63H 21/20 |
| JP | S49-12638 | | | 3/1974 | |
| JP | H09-240572 | A | | 9/1997 | |
| JP | 2010264969 | A | * | 11/2010 | |
| JP | 2011-201399 | A | | 10/2011 | |
| JP | 2013-224145 | A | | 10/2013 | |
| JP | 2014-019251 | A | | 2/2014 | |
| JP | 2017-507074 | | | 3/2017 | |
| KR | 10-2020-0011300 | A | | 2/2020 | |

OTHER PUBLICATIONS

Choi et al., Development and demonstration of PEM fuel-cell-battery hybrid system for propulsion of tourist boat [online]. sciencedirect.com, 2016 [retrieved on Nov. 26, 2025]. Retrieved from the Internet: <URL: https://www.sciencedirect.com/science/article/pii/S0360319915028438>. (Year: 2016).*
DE-10141893-A1 text copy (Year: 2002).*
HR International Search Report as issued in International Patent Application No. PCT/EP2022/053878, dated Apr. 26, 2022.
First Office Action as issued in Chinese Patent Application No. 202280029071.7, dated Mar. 25, 2026.
Office Action as issued in Japanese Patent Application No. 2023-573493, dated Mar. 3, 2026.
"Guidelines for the Use of Alternative Fuels in Ships 2017," China Classification Society, p. 52, Dec. 1, 2027, (Year: 2017) (English translation included).

* cited by examiner

DEVICE FOR REDUCING HYDRODYNAMIC DRAG

CROSS-REFERENCE TO RELATED APPLICATIONS

This application is the U.S. National Stage of PCT/EP2022/053878, filed Feb. 17, 2022, which in turn claims priority to French patent application number 2101536 filed Feb. 17, 2021. The content of these applications are incorporated herein by reference in their entireties.

FIELD

The field of the invention relates to the naval field. More precisely, the field of the invention relates to devices for reducing the hydrodynamic drag of vessels. The field of the invention therefore relates to the field of increasing the energy efficiency of vessels. The field of the invention also relates to the field of vessels using fuel cells in order to provide the electrical energy powering the motors of the vehicle.

BACKGROUND

Drag force is a force opposing the movement of an object immersed in a fluid. This force is applied to the object in movement in the fluid by friction of the fluid on the object. The reduction the of hydrodynamic drag force therefore makes it possible to increase the performance of a vessel by limiting the energy consumed by it. Thus, a device for reducing hydrodynamic drag makes it possible to increase the efficiency of the vehicle.

It is known from the prior art that the use of a static layer of air or a stream of air in contact with the hull of the vessel makes it possible to decrease the frictional forces exerted by water on the hull.

There exist notably in the prior art vessels that comprise in their hulls a fitted cavity enabling the creation of an air cushion that covers a part of the surface of the hull which would otherwise be in contact with water. Such a device is notably known from the document US 2003/159637 A1. Such a device allows an effective reduction of the hydrodynamic drag of the vessel. However, this type of device is ineffective when the swell is too strong, because the waves "break" the air cushion formed under the vessel. In addition, a compressor capable of providing the necessary pressure for the formation and maintenance of the air cushion under the vessel must be used. The operation of the compressor being energy consuming, the energy efficiency of such a device is insufficient. In addition, the presence of a compressor increases the mass of the vessel, which contributes to reducing the energy efficiency thereof.

It is also known to use injectors situated under the hull in order to inject air directly in contact therewith. Such a device is known from the document KR 2020 0011300 A1, which discloses a device for decreasing hydrodynamic drag comprising an injector placed under the hull of the vessel. The injector injects an amount of air directly in contact with the hull and the water, which is an amount of air that lubricates the hull and reduces the drag force. While effective, such a device has the drawback of having to use energy for the operation of a compressor used to inject air. Such use of energy drastically reduces the efficiency of such a system. In addition, the presence of a compressor increases the mass of the vessel, which contributes to reducing the energy efficiency thereof.

It is also known from the prior art vessels using a fuel cell in order to electrically power the motors thereof. Vessels using hydrogen to power the fuel cells and to supply electrical energy to the motor are notably known. Typically, a fuel cell uses the chemical reaction between dihydrogen supplied by a tank and dioxygen found in the ambient air to provide an amount of electrical energy. A fuel cell discharges during this process an amount of warm, moist air into the ambient environment. The cell also discharges an amount of water during the generation of electrical energy. Such vessels have the interest of providing a motorization limiting greenhouse gas emissions.

The invention thus aims to provide a device for reducing hydrodynamic drag making it possible to overcome the drawbacks of existing devices.

SUMMARY

For this purpose, the invention relates to a device for reducing hydrodynamic drag of a vessel which comprises:

- a hull comprising at least one first means of injection of a fluid;
- a fuel cell; and
- a means of conveyance of a first amount of air discharged by the fuel cell to at least the first means of injection, the first means of injection being arranged to inject said first amount of air along a surface of the hull intended to be immersed.

The device for reducing hydrodynamic drag according to the invention advantageously makes it possible to benefit from the limitation of greenhouse gas emissions by proposing the use of a fuel cell. Similarly, thanks to the use of means of injection, the device injects an amount of air under the hull which decreases the hydrodynamic drag of the vessel.

Finally, the device according to the invention makes it possible to reuse the air escaping from the fuel cell in order to inject it under the hull. This arrangement is particularly advantageous, because it makes it possible to avoid the use of a compressor dedicated to the injection of air under the hull. Hence, the device according to the invention makes it possible to significantly increase the energy efficiency of existing drag reduction systems, because the energy used by the compressor is saved. The fact of not having a dedicated compressor also makes it possible to decrease the mass of the vessel. The reduction in the mass of the vessel also enables a reduction in the energy consumption thereof and thus an increase in the energy efficiency thereof.

According to one embodiment, the first means of injection comprises a sealing element to limit or prevent the upwelling of an amount of water to the means of conveyance. This arrangement makes it possible to prevent a rise of water in the means of conveyance and/or in the fuel cell.

According to one embodiment, the first amount of air is injected by the means of injection in the form of air bubbles, said air bubbles preferably having a diameter of less than 5 millimeters. Air bubbles are an effective way of reducing the hydrodynamic drag. The diameter of 5 millimeters corresponds to the thickness of the boundary layer in the vicinity of the hull, and thus represents a dimension for which drag reduction is very effective.

According to one embodiment, the first amount of air is injected by the means of injection in the form of air bubbles, said air bubbles preferably having a diameter comprised between 0.4 millimeters and 1.3 millimeters. These diameter values allow an effective reduction of the hydrodynamic drag.

According to one embodiment, the hull comprises a water wing intended to be immersed and in that said water wing comprises at least one second means of injection arranged to inject at least a portion of the first amount of air. This arrangement makes it possible to reduce the hydrodynamic drag on a vessel comprising a water wing.

According to one embodiment, the second means of injection of the water wing is arranged to inject the portion of the first amount of air along a vertical surface of the water wing. According to this arrangement, the injection of air on the vertical surfaces makes it possible not to decrease the lift of the water wing when the injection is effective.

According to one embodiment, the hull comprises an additional portion forming a setback upstream of the first means of injection, relative to the direction of movement of the vessel. This arrangement makes it possible to create a depression downstream of the additional part. This depression allows air to be sucked through the means of injection to inject it and reduce drag. This arrangement also makes it possible to create locally a turbulent flow, which reinforces the efficiency of the injected air to reduce the hydrodynamic drag.

According to one embodiment, the device comprises a device for commanding and controlling the air flow in the means of conveyance. This arrangement makes it possible to control the injected air flow to optimize the reduction of the hydrodynamic drag.

According to one embodiment, the means of conveyance comprises at least one air flow sensor. This arrangement makes it possible to know the air flow in the means of conveyance. It also makes it possible to adjust this flow by considering its measured value. In the event where the device according to the invention comprises a command-control device, the flow information makes it possible to provide the command-control device with the flow information enabling it to control said flow more efficiently.

According to one embodiment, the device comprises a means of recovery of a second amount of air from the apparent wind of the vehicle, said means of recovery being capable of conveying the second amount of air to the means of conveyance. This arrangement makes it possible to supplement the air flow conveyed to the means of injection with the apparent wind.

According to one aspect, the invention also relates to a method for reducing the hydrodynamic drag of a vessel which comprises the steps of:

- conveyance of a first amount of air discharged by a fuel cell by a means of conveyance to a means of injection comprised by a hull;
- injection of the first amount of air by the means of injection along a surface of the hull intended to be immersed.

The method according to the invention advantageously makes it possible to benefit from the limitation of greenhouse gas emissions by proposing the use of a fuel cell. Similarly, thanks to the use of means of injection, the amount of air injected under the hull decreases the hydrodynamic drag of the vessel.

Finally, the method according to the invention makes it possible to reuse the air escaping from the fuel cell in order to inject it under the hull. This arrangement is particularly advantageous, because it makes it possible to avoid the use of a compressor dedicated to the injection of air under the hull. Hence, the method according to the invention makes it possible to significantly increase the energy efficiency of existing drag reduction systems, because the energy used by the compressor is saved. The fact of not having a dedicated compressor also makes it possible to decrease the mass of the vessel. The reduction in the mass of the vessel also enables a reduction in the energy consumption thereof and thus an increase in the energy efficiency thereof.

BRIEF DESCRIPTION OF THE FIGURES

Other characteristics and advantages of the invention will become clearer upon reading the following detailed description, in reference to the appended figures, that illustrate.

DETAILED DESCRIPTION

Figure 1:
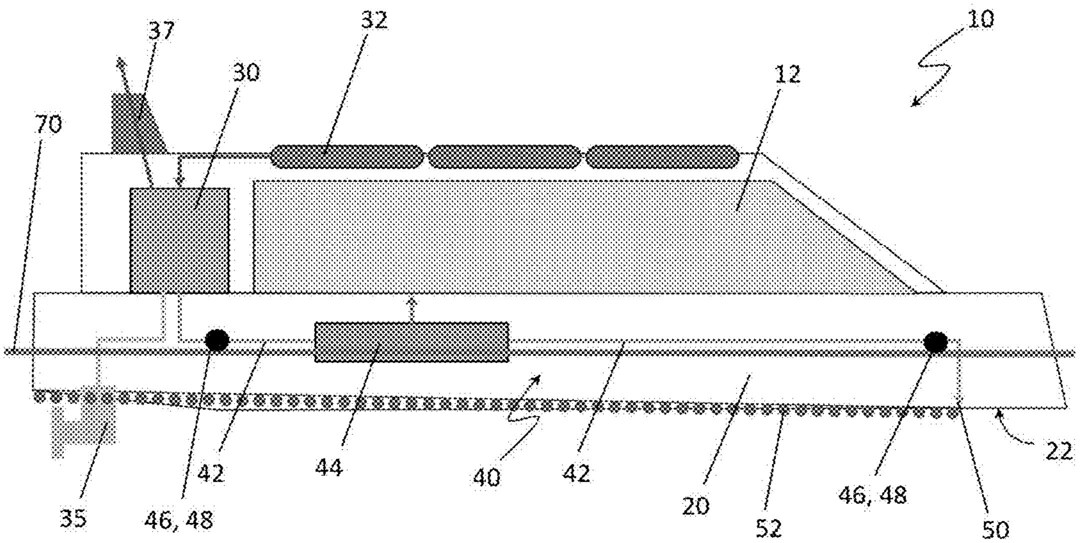
FIG. 1: a schematic profile view of a vessel comprising a device for reducing drag according to a first embodiment of the invention.

FIG. 1 represents a first embodiment of the invention. This figure is a schematic sectional view of a vessel 10 comprising a device for reducing hydrodynamic drag according to the invention. Vessel 10 is taken to mean in this application any type of floating vehicle. The invention thus relates both to marine vehicles such as boats and barges for example. Any type of floating contraption falls within the scope of the invention. Floating and/or submersible contraptions also fall within the scope of the invention. Later in this description, the terms vessel 10 and boat 10 will be used interchangeably.

All the characteristics of the device for reducing hydrodynamic drag according to the invention will also be able to apply to the method for reducing hydrodynamic drag according to the invention.

The vessel 10 comprises a hull 20. The hull 20 is the outer casing of the vessel 10 which is in contact with the water on which the vessel 10 floats and/or is immersed.

The vessel in FIG. 1 comprises a fuel cell 30. The fuel cell 30 uses hydrogen to generate electrical energy. This electrical energy is used to supply the vessel with energy. The energy generated by the fuel cell may be used to power an electric motor 35. The electric motor 35 serves to propel the vessel 10. Alternatively or additionally, the fuel cell 30 supplies electrical energy to on-board systems such as lighting, heating or other systems. The invention also relates to fuel cells that do not use hydrogen. It is thus possible to have a fuel cell operating with reformed methanol or direct methanol. It is also possible to provide a fuel cell operating with direct boron hydride, formic acid, phosphoric acid, molten carbonate or protonic ceramic. All types of fuel cell chemistry may be envisaged.

Fuel cell 30 is taken to mean the fuel cell system assembly. Thus, we speak of both the core of the fuel cell, either an electrochemical device that generates electricity by converting chemical energy into electrical energy thanks to a redox chemical reaction, in which the generation of an electrical voltage is achieved thanks to the oxidation of a reducing fuel coupled to the reduction on the other electrode of an oxidant, such as oxygen in the air, and both the auxiliary systems of said fuel cell, namely among others the battery management electronics and a compressor that supplies the core of the fuel cell with air to bring oxygen to it.

The fuel cell 30 uses a chemical reaction between dihydrogen and dioxygen taken from the ambient air to generate electrical energy. The operation of the fuel cell 30 produces an emission of air which is usually released into the ambient environment for hydrogen-powered boats. In the event of a fuel cell not being supplied with hydrogen, such as the fuel cells described above, the fuel cell also discharges air while operating. The characteristics described before and after thus also apply to fuel cells other than hydrogen fuel cells.

Within the scope of the invention, the device for reducing hydrodynamic drag 40 comprises a means of conveyance of air 42. The means of conveyance of air 42 is arranged at the outlet of the fuel cell 30. This means of conveyance 42 collects the gasses escaping from the fuel cell 30 during the normal operation thereof. The means of conveyance 42 is directly connected to an exhaust outlet of the fuel cell 30.

The means of conveyance 42 is connected to a means of injection 50. The means of injection 50 is integrated in the hull 20. The means of injection 50 is configured to inject the air conveyed by the means of conveyance 42. To do this, it injects an amount of air 52 near the hull 20, opposite a surface the hull 20 which is intended to be immersed when the boat 10 is sailing. The means of injection 50 is thus situated under a waterline 70 of the vessel 10. More precisely, the means of injection 50 injects air 52 near a surface 22 of the hull 20 intended to be immersed.

The operation of the system for reducing hydrodynamic drag 40 will now be described.

When the vessel 10 is in operation, the fuel cell 30 generates electrical energy for it. When it generates electrical energy, it releases a first amount of air. This first amount of air is the exhaust of the fuel cell 30. The first amount of air is collected by the means of conveyance 42. The means of conveyance 42 conveys the first amount of air to the means of injection 50. This means of injection is situated under the hull 20 of the vessel 10. The means of injection 50 injects the first amount of air 52 opposite the surface 22 of the hull 20 which is intended to be immersed. It is recalled that surface 22 of the hull 20 intended to be immersed is taken to mean a surface 22 of the hull 20 placed under the waterline 70 of the vessel 10.

The device for reducing hydrodynamic drag thus comprises the fuel cell 30, the means of conveyance 42, the hull 20 and the means of injection 50.

The device for reducing hydrodynamic drag according to the invention thus makes it possible to reuse the air emanating from the fuel cell when it is generating electrical energy. Air emanating from the fuel cell is taken to mean the air produced during the chemical reaction taking place there within.

The reuse of the first amount of air, which is conveyed to the means of injection 50, allows said amount of air to be injected near the hull 20. This air injection allows a "lubrication" of the hull 20 which decreases the hydrodynamic drag force that water applies to the hull 20. The device 40 according to the invention thus allows a reduction in hydrodynamic drag that allows a reduction in the energy consumption of the vessel 10. In addition, the air being taken directly from the fuel cell, the device 40 is thus devoid of an external means of pressurizing the air to perform the injection. Thus, the device 40 according to the invention makes it possible to significantly increase the output available with devices of the prior art, because it does not consume energy to inject air, the latter being a by-product of the generation of electrical energy of the fuel cell 30. In addition, the device for reducing drag according to the invention makes it possible to reduce the mass of the vessel 10 because a compressor is a heavy device. The reduction in mass also makes it possible to increase the energy efficiency of the vessel 10. Alternatively, the device for reducing drag 40 may comprise an additional compressor. The additional compressor supplements the air flow in the means of conveyance 42. In this way, if the flow and/or the air pressure provided by the fuel cell 30 are insufficient, then the additional compressor supplies the necessary flow and/or pressure. Despite the presence of the additional compressor, the device for reducing drag 40 all the same makes it possible to improve energy efficiency compared to a conventional device for reducing drag because the necessary additional compressor comprises a lower power and mass than that of the compressor used in devices of the prior art.

The vessel 10 may comprise a hydrogen tank 32. In the example shown in FIG. 1, the vessel 10 comprises three hydrogen tanks 32. These tanks 32 are placed on the roof of the boat 10. Hydrogen tanks 32 are an effective means for storing dihydrogen, in gaseous and/or liquid form, which will be used by the fuel cell 30 for its operation. In the context of a fuel cell operating other than with hydrogen, the tank 32 may be used to store a gas other than dihydrogen.

The vessel 10 may advantageously be a catamaran. Catamaran is taken to mean a vessel comprising two hulls or floaters. This is notably the case for the vessels 10 presented in the figures of this application, where the part of the hull 20 represented is one of the two floats which comprises said hull 20. However, the invention also relates to single-hull or multi-hull vessels. Thus, all the characteristics of the device for reducing drag 40 according to the invention presented in this application apply indifferently to single-hull vessels, catamarans, multi-hull vessels or any other type of vessel.

The vessel 10 may comprise an exhaust stack 37. The exhaust stack allows the escape of a gas overpressure that could have formed in the fuel cell 30. This stack 37 is connected to the fuel cell and is used in the event of overpressure in the fuel cell 30. The exhaust stack 37 is also used in the event of overpressure in the auxiliary systems of the fuel cell 30, such as the distribution systems or the tanks for example.

According to one aspect, the fuel cell 30 electrically powers an electric motor 35. This electric motor 35 allows propulsion of the vessel 10.

According to one aspect, the fuel cell 30 electrically powers one or more electric batteries that it charges. According to this aspect, it is the electric batteries that electrically power the electric motor 35.

According to one aspect, the vessel 10 is a passenger transport vessel. According to this characteristic, the passengers are transported in a cabin 12 of the vessel 10. Alternatively or additionally, the vessel 10 is a vessel dedicated to another purpose, e.g. cargo transport, fishing, recreation, military applications. This list of uses for the boat 10 is not exhaustive.

Conveyance of the First Amount of Air

According to one aspect, the means of conveyance of the air discharged by the fuel cell 30 is a conduit. A conduit is taken to mean any type of means such as a pipe or a set of pipes linked together. Alternatively or additionally, the means of conveyance 42 is a tube, preferably a flexible tube. The means of conveyance 42 may also be a set of tubes connected to each other. For example, a means of conveyance may be provided comprising a rigid tube and a flexible tube placed in series.

According to one aspect, the means of conveyance 42 comprises a heat exchanger 44 on its passage. The heat exchanger 44 recovers heat from the first amount of air discharged by the fuel cell 30. It may be noted that the air discharged by the fuel cell 30 is hot. Advantageously, the heat recovered by the heat exchanger 30 is used to heat the cabin 12 of the vessel 10.

According to one aspect, the device for reducing hydrodynamic drag comprises a command-control device for the flow of air conveyed by the means of conveyance 42. According to this aspect, the command-control device makes it possible to control the flow passing through the means of conveyance 42. This arrangement makes it possible to control an air flow coming out of the fuel cell 30. This arrangement also makes it possible to control the air flow injected by the means of injection 50. In this way, the injected air flow can be controlled to optimize the lubrication of the hull 20 by air. According to one aspect, the means of conveyance 42 comprises an exhaust (not shown in the figures) which makes it possible to release an excess air flow. In this way, if the air flow coming out of the fuel cell 30 is greater than that desired for lubrication, it is possible to release part of this flow into the surrounding air or surrounding water to adapt the flow released by the means of injection 50.

According to one aspect, the command-control device also controls the operation of the fuel cell 30. For example, it can control the power generated by the fuel cell 30 as well as its supply of reagents such as hydrogen. The command-control device may also be used to control other elements of the vessel 10 in addition to the device for reducing drag 10.

According to one aspect, the device for reducing hydrodynamic drag 10 comprises at least one flow sensor 46. The flow sensor 46 measures an air flow. The flow sensor 46 may be placed at the outlet of the fuel cell 30. The flow sensor may for example be comprised by the means of conveyance of air 42. It may for example be placed to measure the air flow in the means of conveyance 42 at the outlet of the fuel cell 30. A flow sensor 46 at the outlet of the means of conveyance 42, before the means of injection 50, may also be provided. According to one aspect, the device 10 comprises several flow sensors 46. These sensors may for example be placed at the inlet and outlet of the means of conveyance 42.

According to one aspect, the device for reducing hydrodynamic drag 10 comprises at least one pressure sensor 48. The pressure sensor 48 measures the air pressure. The pressure sensor 48 may be placed at the outlet of the fuel cell 30. The pressure sensor 48 may for example be comprised by the means of conveyance of air 42. For example, it may be placed to measure the air pressure in the means of conveyance 42 at the outlet of the fuel cell 30. A pressure sensor 48 at the outlet of the means of conveyance 42, before the means of injection 50, may also be provided. According to one aspect, the device 10 comprises several pressure sensors 48. These pressure sensors 48 may for example be placed at the inlet and outlet of the means of conveyance 42.

According to one aspect, the means of conveyance 42 comprises at least one pressure sensor 48 and at least one flow sensor 46. According to the embodiment shown in FIG. 1, the means of conveyance 42 comprises a flow sensor 46 and a pressure sensor 48 at the outlet of the fuel cell 30. According to this embodiment, the means of conveyance 42 also comprises a flow sensor 46 and a pressure sensor 48 at the outlet of the means of conveyance 42, upstream of the means of injection 50.

According to one aspect of the invention, the device for reducing hydrodynamic drag 40 comprises an air flow command-control system. According to this aspect, the device 40 comprises at least one pressure sensor 48 and one flow sensor 46. According to this aspect, the device 40 also comprises at least one exhaust as described above. According to this aspect, the command-control device can open the exhaust as a function of the pressure and/or flow information transmitted by the sensors 46, 48. This arrangement allows automatic opening of the circuit in the event of overpressure for example.

According to one aspect, the device for reducing drag 40 comprises a computer. The computer is configured to command the opening of the exhaust as a function of the pressure data or the pressure sensors 48. The computer can also command the opening of the exhaust as a function of the flow data from the flow sensors 46.

Capture of the Apparent Wind

Figure 3:
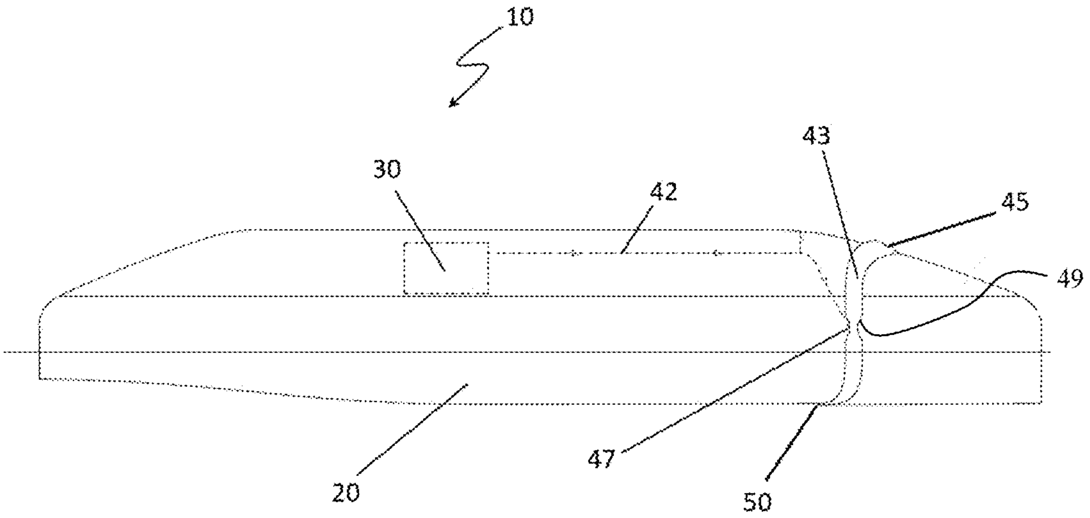
FIG. 3: a schematic partial sectional view of a hull of a vessel comprising a device for reducing drag according to a third embodiment of the invention.

According to one embodiment presented in FIG. 3, the device for reducing drag 40 comprises a means of recovery 43 of air from the apparent wind of the vessel 10. Apparent wind is taken to mean the wind experienced on board the vessel 10 when said vessel is moving. The apparent wind is the composition of the actual wind and the relative wind created by the movement of the vessel 10.

The means of recovery of the apparent wind 43 is situated on the vessel 10 at a level that is above the waterline of said vessel 10. Thus, the means of recovery 43 recovers the apparent wind and not water.

The means of recovery 43 conveys a second amount of air to the means of conveyance 42. In this way, the second amount of air is added to the first amount of air coming from the fuel cell 30. Thus, the air flow conveyed to the one or more means of injection 50 may be increased. Similarly, if the fuel cell 30 does not provide enough air to ensure a sufficient drag reduction, the second amount of air can be added to inject enough air.

According to one aspect, the means of recovery 43 comprises an opening 45 through which the apparent wind is collected. This opening 45 may be an intake opening to the outside air.

According to one aspect, the means of recovery 43 comprises a tube or a pipe. This tube or pipe may be rigid or flexible. It connects the opening 45 or the intake of the means of recovery 43 to the means of conveyance 42.

According to one aspect, the means of recovery 43 is linked to the means of conveyance 42 at the level of a junction 47.

According to one aspect, the means of recovery 43 comprises a reduction in section 49. According to this arrangement, the tube or pipe of the means of recovery 43 comprises a normal section. The normal section is substantially constant along the tube or the pipe. At the level of the reduction in section 49, this narrows. This arrangement makes it possible, by means of a venturi effect, to accelerate the flow of air into the means of recovery 43.

According to one aspect, the junction 47 between the means of conveyance 42 and the means of recovery 43 is situated at the level of the reduction in section 49 of the means of recovery 43. This arrangement is visible in FIG. 3. This arrangement makes it possible to accelerate the flow of the first amount of air coming from the means of conveyance 42, by venturi effect.

According to one aspect, the junction 47 is situated at the level of the reduction in section 41 of the means of conveyance. This arrangement accelerates the flow of the second quantity of air from the means of recovery 43, by venturi effect.

According to one embodiment, the means of recovery 43 comprises at least one pressure sensor (not shown). The pressure sensor measures the air pressure in the means of recovery 43.

According to one embodiment, the means of recovery 43 comprises at least one flow sensor (not shown). The flow sensor measures the air flow in the means of recovery 43.

According to one aspect, the flow sensor of the means of recovery 43 and/or the pressure sensor of the means of recovery 43 are connected to the command-control system. This system can control the opening or closing of the means of recovery 43 to control the air flow coming therefrom into the means of conveyance 42.

All the arrangements described herein regarding the means of recovery of the apparent wind 43 are compatible with the characteristics described in the other embodiments.

Air Injection

As stated previously, the device for reducing drag 40 comprises at least one means of injection 50 of air.

Means of injection 50 is taken to mean for example an injector 50. The means of injection may also be an opening of the means of conveyance 42 at the level of the hull 20 of the vessel 10.

According to one arrangement, the hull 20 comprises a plurality of means of injection 50, in addition to the means of injection 50 shown in FIG. 1. For example, the hull 20 may comprise two means of injection 50, one situated slightly to port, relative to a longitudinal axis of the hull of the vessel 10, and another to starboard. In this way, the immersed parts of the hull 20 are lubricated by injected air over the entire width of the hull 20. Several means of injection 50 may also be provided on an axis going from the bow to the stern of the vessel 10. According to one aspect, the plurality of means of injection 50 covers a large part of the surface 22 intended to be immersed of the hull 20. When the system for reducing drag 40 comprises several means of injection 50, the means of conveyance 42 comprises several branches to supply air to all the means of injection 50.

A plurality of means of injection 50 placed along the surface 22 of the hull 20 intended to be immersed may also be provided. For example, there may be a plurality of means of injection 50 aligned along two lines each forming a "V" under the hull 20. The tip of the "V" may point either towards the bow of the vessel 10 or towards the stern of the vessel 10. Several means of injection 50 arranged along a line of the hull 20 perpendicular to the longitudinal axis of the vessel 10 may also be provided. Several lines of means of injection 50 along the hull 20 may also be provided. For example, two parallel lines may be provided, each comprising a plurality of means of injection 50, the two lines being perpendicular to the longitudinal axis of the vessel 10. The number of means of injection 50 along each line may vary from one line to another. For example, there can be ten means of injection 50 per line. There may also be one line with ten means of injection 50, and another line with 5 means of injection 50.

The number and distribution of the means of injection 50 remains at the discretion of the person skilled in the art, in order to maximize the efficiency of the reduction in hydrodynamic drag.

According to one embodiment, the surface intended to be immersed 22 of the hull 20 comprises a substantially flat bottom. According to this arrangement, the flat bottom makes it possible to keep the injected air flow under the hull. In this way, the air does not rise to the water surface through the sides of the hull 20. Consequently, the injected air flow covers a larger surface instead of escaping at the edges. In this way, a larger part of the surface intended to be immersed 22 is covered by the air flow. The lubrication of the hull 20 is thus more efficient.

According to one aspect, the means of injection 50 comprise an anti-return means. The anti-return means is a device preventing the rise of water from outside the vessel 10 by the means of conveyance 42. This arrangement makes it possible to prevent a rise of water inside the vessel, and in particular to the fuel cell 30.

According to one aspect, the non-return means is a non-return valve. Alternatively, the non-return means is a valve, preferably a solenoid valve commanded by the command-control system.

According to one aspect, the means of injection 50 does not comprise an anti-return means. According to this alternative, external water may enter the means of conveyance 42. When the air is not injected, the water thus rises in the means of conveyance 42 up to the waterline of the vessel 10. When the device for reducing drag 40 is switched on, the injected air pushes the water out of the means of conveyance 42.

According to one aspect, the air injected by the means of injection 50 is injected in the form of air bubbles. Air bubbles are a highly effective means of air lubrication of the hull 20.

According to one aspect, the injected air bubbles have a diameter comprised between 0.1 millimeters and 100 millimeters. According to one aspect, the injected air bubbles have a diameter comprised between 0.2 millimeters and 20 millimeters.

According to one aspect, the air bubbles have a diameter of less than 5 millimeters. According to this arrangement, the air bubbles therefore have a diameter of less than 5 mm, a distance corresponding to the thickness of the fluid flow boundary layer in the vicinity of the hull 20.

According to one aspect, the injected air bubbles have an average diameter comprised between 0.4 and 1.3 millimeters. Bubbles in this range of diameters have a high efficiency for decreasing hydrodynamic drag.

According to one embodiment, the injected bubbles form a sheet of air under the hull of the vessel. According to one embodiment, the air bubbles are injected at a flow rate sufficient for them to merge after they exit the means of injection. Such an arrangement makes it possible to form an air sheet under the hull, a sheet which makes it possible to significantly reduce friction on said hull. Hence, the hydrodynamic drag is significantly reduced.

According to one embodiment, the air bubbles form a mixed layer under the hull. Mixed layer is taken to mean a layer comprising parts in which it is in the form of a sheet and parts in which it is in the form of bubbles. This arrangement makes it possible to reduce friction on the hull of the vessel while requiring less injected air flow than in the case of a sheet.

According to one aspect, the means of injection 50 comprises an adaptable nozzle. According to this aspect, the nozzle has a shape which is adaptable to adapt the air injection. According to one aspect, the diameter of the nozzle is adaptable. According to this aspect, the diameter of the nozzle adapts to control the size of the injected air bubbles. According to one aspect, the adaptation of the nozzle is controlled by the command-control device. In this way, the command-control device can control the air injection. Preferably, the command-control device controls the diameter of the nozzle. Thus, the diameter of the air bubbles is controlled directly by the command-control device.

Water Wings

According to one embodiment, the hull 20 comprises at least one water wing 60. The hull may also comprise one, two, three, four or more additional water wings 60. A water wing 60 is a part of the hull 20 comprising a hydrodynamic profile making it possible to elevate the vessel 10 while it is in motion. This type of device is also often referred to as a hydrofoil or foil.

Raising the vessel 10 while it is moving makes it possible to decrease the surface and volume of the vessel that is in the water. Thus, this type of device makes it possible to reduce the forces opposing the movement of the vessel 10 by the surrounding water.

Figure 2:
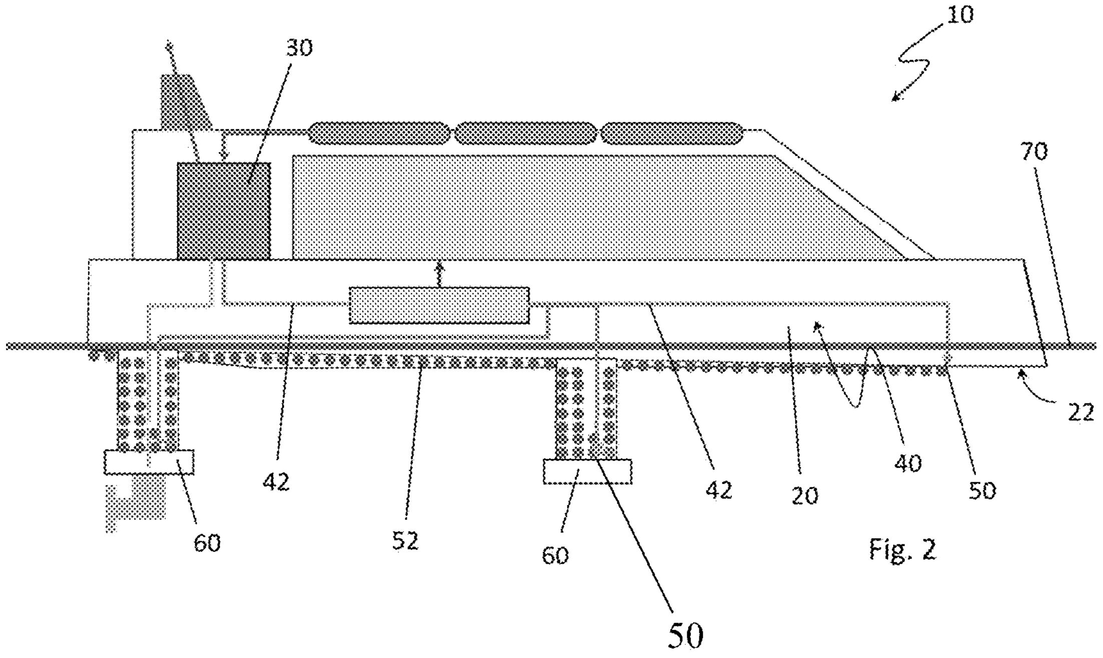
FIG. 2: a schematic profile view of a vessel comprising a device for reducing drag according to a second embodiment of the invention.

FIG. 2 illustrates the case of a hull 20 comprising two water wings 60. FIG. 2 also shows a waterline 70 of the vessel. This waterline 70 is situated lower on the hull 30 than the waterline of the vessel 10 when stopped, under the effect of the water wing 60. Thus, when the boat 10 is in motion and at its waterline at the level of the waterline in Archimedean mode 70, the forces of the water opposing its movement are lower than without a water wing 60.

According to one aspect, the water wing 60 comprises at least one means of injection 50 of the air conveyed by the means of conveyance 42. FIG. 2 shows two means of injection 50. The means of injection 50 of the water wing 60 makes it possible to lubricate the surface of the water wing 60. This arrangement makes it possible to increase the efficiency of the device for reducing drag 40 by reducing the hydrodynamic drag suffered by the water wing 60. When the hull 20 comprises several water wings 60, each of them may comprise at least one means of injection 50.

According to one aspect, the means of injection 50 of the water wing(s) 60 are located only on vertical parts of the water wing. According to this arrangement, the air injected in the neighborhood of the water wing 60 does not concern the neighborhood of the horizontal part thereof. The horizontal parts of the water wing are responsible for the lift of said water wing 60. In other words, it is the horizontal parts of the water wing 60 that allow the vessel 10 to be raised when it is in motion. Not lubricating these parts with injected air makes it possible not to decrease the lift involved by said water wings 60. In this way, the rising effect of the water wings 60 is not limited.

According to one aspect, the command-control system makes it possible to stop the injection of air at the level of one or several means of injection 50.

According to one aspect, the command-control system can control the closing of valves of the means of conveyance 42. Thus, the command-control system can stop the injection of air in the desired means of injection 50.

Layout of the Hull

Figure 4:
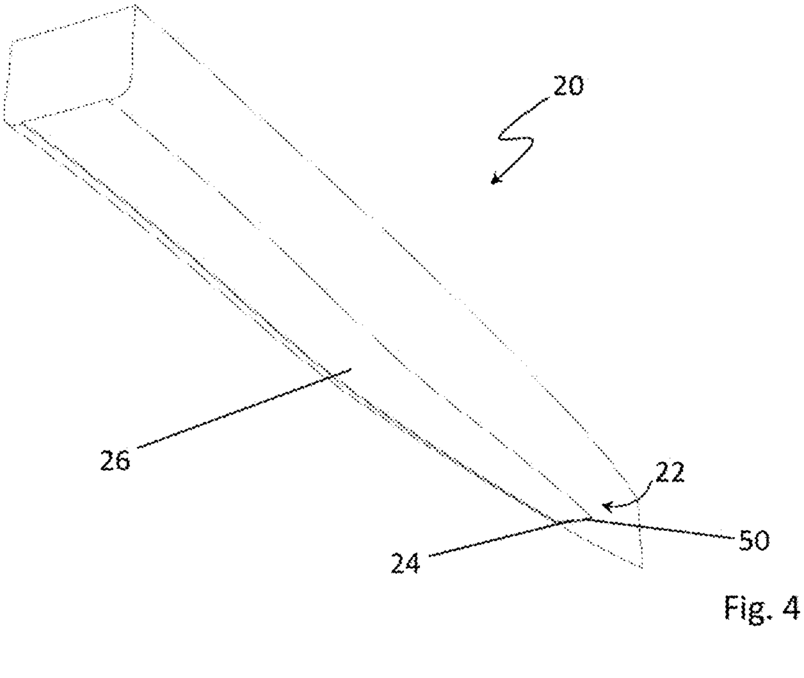
FIG. 4: a sectional view of a vessel hull according to a fourth embodiment of the invention.

According to one aspect of the invention, the hull 20 comprises a setback 24. This setback 24 is visible in FIG. 4. The setback 24 is a step in the hull 24 comprising a surface that is vertical when the vessel 10 is on the water. The vertical surface of the setback 24 is oriented on a free side towards the aft of the vessel 10.

According to one aspect, the means of injection 50 are placed on the vertical surface of the setback 24. In this way, the means of injection 50 inject the air into the water in a direction going from the front to the back of the boat 10. The setback 24 advantageously makes it possible, when the boat 10 is in motion, to create a water depression behind said setback 24. This depression sucks air from the means of conveyance 42 by the means of injection 50. This arrangement thus facilitates the injection of air. In addition, the setback 24 makes it possible to make the water flow turbulent close to the setback 24. Creating a turbulent flow near and behind the setback 24 makes it possible to oscillate the air bubbles injected along the length of the hull 30. Oscillation of the injected air bubbles increases the lubrication efficiency and thus the efficiency of the device for reducing drag 40.

According to one aspect, the hull 20 comprises an indentation 26. The indentation 26 is a part of the hull 20 that is pushed inwards from the hull 26. Advantageously, the indentation 26 comprises the setback 24. It is also formed by at least two other lateral setbacks. The indentation 26 forms a cavity in the surface 22 of the hull 20 which retains the injected air in contact with the hull 20, preventing it from rising on the sides of the hull 20. In this way, the injected air follows the hull along its entire length. Thus, the rear of the hull 20 is well lubricated by the injected air. The indentation 26 thus forms a channel for the injected air.

According to one arrangement, the hull 20 comprises at least one slider arranged on its surface 22. Slider is taken to mean a form of bead protruding from the hull 20. The projection is preferably of a low height, thus making it possible to make the flow of water downstream of the slider turbulent. In other words, the slider has a bead or half-bead shape arranged on the hull 20. One or more sliders with a half-cylinder shape may also be provided. The slider preferably has a streamlined shape. Streamlined shape is taken to mean a shape which only opposes little resistance to the flow of a fluid surrounding the shape. Preferably, this slider is situated directly upstream from one or more means of injection 50. This slider may also be situated directly downstream of the one or more means of injection 50. The slider advantageously makes it possible to make the flow of water turbulent at the passage of said slider. This arrangement thus makes lubrication by the injected air more effective. In addition, the hull 20 may comprise a plurality of sliders which are situated upstream and downstream of each means of injection 50. Sliders may also be provided downstream of the means of injection 50, but situated further away from them. These sliders can prevent the flow in contact with the hull from becoming laminar, with the aim of maintaining a turbulent flow in contact with the hull throughout the passage of the injected air.

NOMENCLATURE

10: Vessel
12: Cabin
20: Hull
22: Surface of the hull intended to be immersed
24: Setback of the hull
26: Indentation of the hull
30: Fuel cell
32: Hydrogen tank
35: Motor
37: Exhaust stack
40: Device for reducing hydrodynamic drag
42: Means of conveyance of the air discharged by the fuel cell
43: Means of recovery of the apparent wind
44: Heat exchanger
45: Opening of the means of recovery of the apparent wind
46: Air flow sensor
47: Junction
48: Pressure sensor
49: Reduction in the section of the means of recovery of the apparent wind

50: Means of injection of the first amount of air
52: Air injected by the means of injection
60: Water wing
70: Waterline

The invention claimed is:

1. A device for reducing hydrodynamic drag of a vessel comprising:

a hull comprising at least one first means of injection of a fluid;

a fuel cell, and a means of conveyance of a first amount of air discharged by the fuel cell as a result of a chemical reaction taking place in the fuel cell to the at least one first means of injection, the at least one first means of injection being arranged to inject said first amount of air along a surface of the hull intended to be immersed.

2. The device according to claim 1, wherein the at least one first means of injection comprises a sealing element to limit or prevent the upwelling of an amount of water to the means of conveyance.

3. The device according to claim 1, wherein the first amount of air is injected by the at least one first means of injection in the form of air bubbles.

4. The device according to claim 1, wherein the hull comprises a water wing intended to be immersed and wherein said water wing comprises at least one second means of injection arranged to inject at least a portion of the first amount of air.

5. The device according to claim 4, wherein the at least one second means of injection of the water wing is arranged to inject the portion of the first amount of air along a vertical surface of the water wing.

6. The device according to claim 1, wherein the hull comprises an additional portion forming a setback upstream of the at least one first means of injection, relative to a direction of movement of the vessel.

7. The device according to claim 1, comprising a command-control device for the air flow in the means of conveyance.

8. The device according to claim 1, wherein the means of conveyance comprises at least one air flow sensor.

9. The device according to claim 1, comprising a means of recovery of a second amount of air from an apparent wind of the vessel, said means of recovery being capable of conveying the second amount of air to the means of conveyance.

* * * * *